(12) United States Patent
Fujimaki

(10) Patent No.: US 7,457,653 B2
(45) Date of Patent: Nov. 25, 2008

(54) METHOD OF SOLVING MAGNETOENCEPHALOGRAPHIC AND ELECTROENCEPHALOGRAPHIC INVERSE PROBLEMS

(75) Inventor: Norio Fujimaki, Koganei (JP)

(73) Assignee: National Institute of Information Communications Technology, Koganei-shi (JP)

( * ) Notice: Subject to any disclaimer, the term of this patent is extended or adjusted under 35 U.S.C. 154(b) by 836 days.

(21) Appl. No.: 10/158,147

(22) Filed: May 31, 2002

(65) Prior Publication Data

US 2003/0081818 A1 May 1, 2003

(30) Foreign Application Priority Data

Oct. 26, 2001 (JP) ............................. 2001-329174

(51) Int. Cl.
*A61B 5/05* (2006.01)
(52) U.S. Cl. ..................... 600/407; 324/301; 324/302
(58) Field of Classification Search ......... 600/407–409; 324/301, 302, 200–263
See application file for complete search history.

(56) References Cited

U.S. PATENT DOCUMENTS

| | | | | |
|---|---|---|---|---|
| 4,949,725 | A | * | 8/1990 | Raviv et al. ................. 600/544 |
| 5,263,488 | A | * | 11/1993 | Van Veen et al. ............ 600/544 |
| 5,331,970 | A | * | 7/1994 | Gevins et al. ............... 600/544 |
| 5,524,086 | A | | 6/1996 | Kiyuna et al. |
| 6,697,660 | B1 | * | 2/2004 | Robinson .................... 600/409 |

FOREIGN PATENT DOCUMENTS

JP 7-51241 2/1995

OTHER PUBLICATIONS

A. Korvenoja, et al., Human Brain Mapping, vol. 8, pp. 13-27, "Activation of Multiple Cortical Areas in Response to Somatosensory Stimulation: Combined Magnetoencephalographic and Functional Magnetic Resonance Imaging", 1999.

N. Fujimaki, et al., Journal of the Japan Biomagnetism and Biomagnetics Society, vol. 13, No. 1, pp. 162-163, "Fitting Characteristics in MEG Inverse Problems with Position Constraint", 2000 (with partial English translation).

N. Fujimaki, et al., Neuroimage, vol. 11, No. 5, p. s657, "Simulations of Anisotropic Fitting Characteristics in MEG Inverse Problems with Position Constraint", 2000.

N. Fujimaki, et al., Biomag 2000, Proceedings of the 12th International Conference on Biomagnetism, p. 184b, "Criteria for Fitting MEG Dipoles with FMRI Position Constraints", Aug. 13-17, 2000.

(Continued)

*Primary Examiner*—Brian L. Casler
*Assistant Examiner*—Sanjay Cattungal
(74) *Attorney, Agent, or Firm*—Oblon, Spivak, McClelland, Maier & Neustadt, P.C.

(57) ABSTRACT

A method of solving magnetoencephalographic and electroencephalographic inverse problems provides better grouping of moments of equivalent current dipoles than conventional methods. Locations of dipoles are fixed based on information using fMRI or the like. The magnitudes and orientations of the dipole moments are adjusted to fit magnetic fields and/or electrical potential distributions produced by the dipoles to magnetoencephalographically and/or electroencephalographically measured data. The method also includes grouping the dipoles in two stages, using the correlation coefficient of the magnitudes of the dipole moments as a criterion.

39 Claims, 7 Drawing Sheets

OTHER PUBLICATIONS

T. Hayakawa, et al., Journal of the Japan Biomagnetism and Biomagnetics Society, vol 14, No. 1, pp. 180-181, "Human Brain Activity in Visual Search Stimuli Assessed by MEG Multi-Dipole Analysis with FMRI Position Constraint", 2001 (with partial English translation).

A. M. Dale, et al., Neuron, vol. 26, pp. 55-67, "Dynamic Statistical Parametric Mapping: Combining FMRI and MEG for High-Resolution Imaging of Cortical Activity", Apr. 2000.

K. Matsuura, et al., IEEE Transactions on Biomedical Engineering, vol. 42, No. 6, pp. 608-615, "Selective Minimum-Norm Solution of the Biomagnetic Inverse Problem", Jun. 1995.

* cited by examiner

METHOD OF SOLVING MAGNETOENCEPHALOGRAPHIC AND ELECTROENCEPHALOGRAPHIC INVERSE PROBLEMS

BACKGROUND OF THE INVENTION

1. Field of the Invention

The present invention relates to a method of solving magnetoencephalographic and electroencephalographic inverse problems for use with systems for measuring or diagnosing brain functions. It particularly relates to a method of solving magnetoencephalographic and electroencephalographic inverse problems that enables equivalent current dipoles of the brain to be obtained from magnetoencephalograms or electroencephalograms.

2. Description of the Prior Art

A magnetoencephalography (MEG) is an apparatus used for non-invasively measuring the biomagnetic field resulting from neural activities. A recording of these magnetic fields by an MEG is called a magnetoencephalogram. The biomagnetic field involved has a magnetic flux density of from about $10^{-12}$ T to $10^{-13}$, which is about 100-millionth the flux density of the earth's magnetic field ($0.5 \times 10^{-4}$T). For this reason, Superconducting Quantum Interference Devices (SQUIDs) with sensitivity in the order of $10^{-14}$ T to $10^{-15}$ T are used to measure the biomagnetic field in a magnetically shielded room that blocks out ambient magnetic noise.

This neural biomagnetic field is produced by an ionic current flow in the cerebral cortex that arises when the cerebral cortex is stimulated. These currents are approximated by equivalent current dipoles (ECDs). Each of these equivalent current dipoles appears as the summed equivalent of the electrical activity of clusters of several thousands to several tens of thousands of neurons. The unit of these equivalent current dipole moments is the ampere-meter, different from a magnetic dipole. A magnetic field is produced around these equivalent current dipoles. The MEG measures the sum of the magnetic fields produced by the electrical activity of these neuron clusters. A flow of distributed current to the scalp shows up as an electrical potential difference between electrodes located at two points on the scalp. An apparatus called an electroencephalography (EEG) is used to measure this difference in electrical potential.

A number of equivalent current dipoles can be found by measuring the intensity of the magnetic field in the proximity of the scalp. These are referred to as MEG inverse problems. However, solutions to MEG inverse problems cannot be uniquely determined. Adding various conditions is among methods that are being used in an attempt to narrow the number of feasible solutions. One such method uses functional magnetic resonance imaging (fMRI). A number of equivalent current dipoles can also be found by measuring the electrical potential distribution on the scalp; these are referred to as EEG inverse problems.

As in ordinary magnetic resonance imaging, fMRI utilizes mainly proton signals for the imaging. In addition to using proton densities and various relaxation times to produce contrast in the images, as in the case of ordinary MRI, fMRI also reflects physiological functions. In particular, fMRI can image changes in the brain activity of a test subject as he works out a problem. In the course of working out a problem, brain activity is accompanied by the localized changes in oxygen consumption. This gives rise to changes in the blood flow, changing the concentration of deoxyhemoglobin, which is paramagnetic, having magnetization with the opposite polarity as that of the diamagnetism of the surrounding medium. Thus, the uniformity of the magnetic field undergoes localized changes, changing the free induction decay relaxation time of the magnetic resonance signal following proton excitation. This is known as the blood oxygen level dependent (BOLD) effect. fMRI utilizes this effect for high-speed generation of images of brain slices, thereby producing images of these activity states. With a spatial resolution in the order of several millimeters, fMRI has high potential.

Reference 1 (A. Korvenoja et al., "Activation of multiple cortical areas in response to somatosensory stimulation: combined magnetoencephalographic and functional magnetic resonance imaging," Human Brain Mapping, Vol. 8, pp. 13-27, 1999) is an example of a paper that describes combining fMRI data and MEG data and fixing the location of equivalent current dipoles at brain activation peaks obtained from the fMRI data.

Various methods have been devised for actually solving magnetoencephalogram inverse problems from the above perspective. For example, fixing the locations of equivalent current dipoles only at fMRI activation volumes, and dividing up such volumes when they are large and locating an equivalent current dipole in each subvolume, is one such solution described in Reference 2 (N. Fujimaki et al., "Fitting characteristics in MEG inverse problems with position constraint," Journal of the Japan Biomagnetism and Biomagnetics Society, Vol. 13, No. 1, pp. 162-163, 2000 (Collected Papers of the 15th Meeting of the Japan Biomagnetism and Biomagnetics Society, May 26-27, 2000, Tsukuba)), and in Reference 3, (N. Fujimaki et al., "Simulations of anisotropic fitting characteristics in MEG inverse problems with position constraint," NeuroImage, Vol. 11, No. 5, p. 8657, 2000 (6th International Conference on Functional Mapping of Human Brain, Jun. 12-16, 2000, San Antonio)). Reference 4 (N. Fujimaki et al., "Criteria for fitting MEG dipoles with fMRI position constraints," Proceedings of the 12th International Conference on Biomagnetism (Aug. 13-16, 2000, Helsinki)) discusses how to place dipoles with respect to spatially extended neural sources, and how to account for crosstalk influences between neighboring dipoles. In particular, Reference 4 focused on a method of handling the dipoles within a specific distance as one. Reference 5 (T. Hayakawa at al., "Human brain activity in visual search stimuli assessed by MEG multi-dipole analysis with fMRI position constraint," Journal of the Japan Biomagnetism and Siomagnetics Society, Vol. 14, No. 1, pp. 180-181, 2001 (Collected Papers of the 16th Meeting of the Japan Biomagnetism and Biomagnetics Society, Jun. 1-2, 2001, Koganei)) relates to time characteristics of brain activity analyzed using analysis of multiple dipoles with fMRI position constraints. Reference 6 (A. Dale, et al., "Dynamical statistical parametric mapping: combining fMRI and MEG for high-resolution imaging of cortical activity," Neuron, Vol. 26, pp. 55-67, 2000) discusses solving the problems with respect to a large number of equivalent current dipole moments, using statistical techniques combining fMRI-based information on areas of brain activity and MEG data, taking noise into account.

These conventional methods solve magnetoencephalogram inverse problems by:

1) using fMRI to obtain information on the location of brain activity;
2) locating equivalent current dipoles at brain activity areas; and
3) aligning just the dipole moment magnitudes and orientations with the MEG data.

For example, with respect to two neighboring dipoles described in Reference 4, 4) when the distance between the two equivalent current dipoles was either not more than a predetermined reference distance used as a criterion, or
5) when the magnitudes of the two dipole moments were simultaneously large (significantly higher than the noise level), it meant there was a high interdependence between the dipoles, and therefore there was a high possibility of crosstalk, so these were grouped (the vector sum obtained), replacing them by one dipole.

With respect to conditions 4) and 5), if the reference distance between the dipoles is reduced to around 2 cm, there is a higher possibility that the interdependence of each will remain, so that the grouping will be inadequate. Conversely, if a distance of around 4 cm is used, that possibility decreases. However, each pair of neighboring dipoles within a distance of 4 cm is grouped so that dipoles that are separated by quite a distance would be grouped. This is called the chaining effect. Grouping with the long reference distance would group dipoles within 4 cm even when there is low crosstalk. As such, it can be foreseen that when grouping is based on the criteria of distance between dipoles and the magnitudes of two dipoles, as in the case of the above conditions 4) and 5), groups cannot be optimized.

When this was examined using examples of real data, it was found that in some cases, appropriate groupings could not be achieved only with respect to conditions 4) and 5). For example, crosstalk was strongly dependent not only on dipole position, but also on the position and moment orientation of neural current sources that produce magnetic fields in the brain. Thus, there are cases where interdependency is high, even when the criterion distance between dipoles of the above 4) is exceeded, and other cases where there is low crosstalk even within the distance.

An object of the present invention is to provide a method of solving magnetoencephalogram inverse problems that provides better optimization than conventional methods of grouping moments of equivalent current dipoles.

SUMMARY OF THE INVENTION

To attain the above object, the present invention provides a method of solving magnetoencephalogram inverse problems, the method comprising: a step of adjusting magnitudes and orientations of equivalent current dipole moments of equivalent current dipoles disposed at predetermined locations to fit magnetic fields produced by the equivalent current dipoles to measured data obtained with a magnetoencephalography, and a step of grouping the equivalent current dipoles based on a predetermined criterion pertaining to a correlation coefficient of equivalent current dipole magnitudes.

To above object is also attained by a method of solving magnetoencephalogram inverse problems that comprises a step of adjusting magnitudes and orientations of equivalent current dipole moments of equivalent current dipoles disposed at predetermined locations to fit magnetic fields produced by the equivalent current dipoles to measured data obtained with a magnetoencephalography, a first grouping step in which the equivalent current dipoles are grouped based on a predetermined criterion pertaining to a distance between current dipoles, and a second grouping step in which the equivalent current dipoles are grouped based on a predetermined criterion pertaining to a correlation coefficient of equivalent current dipole magnitudes.

The object is also attained by a method that comprises a step of adjusting magnitudes and orientations of equivalent current dipole moments of equivalent current dipoles disposed at predetermined locations to fit electrical potential distributions produced by the equivalent current dipoles to measured data obtained with an electroencephalography, and a step of grouping the equivalent current dipoles based on a predetermined criterion pertaining to a correlation coefficient of equivalent current dipole magnitudes.

The object is also attained by a method that comprises a step of adjusting magnitudes and orientations of equivalent current dipole moments of equivalent current dipoles disposed at predetermined locations to fit electrical potential distributions produced by the equivalent current dipoles to measured data obtained with an electroencephalography, a first grouping step in which the equivalent current dipoles are grouped based on a predetermined criterion pertaining to a distance between current dipoles, and a second grouping step in which the equivalent current dipoles are grouped based on a predetermined criterion pertaining to a correlation coefficient of equivalent current dipole magnitudes.

The object is also attained by a method that comprises a step of adjusting magnitudes and orientations of equivalent current dipole moments of equivalent current dipoles disposed at predetermined locations to fit magnetic fields and electrical potential distributions produced by the equivalent current dipoles to measured data obtained with a magnetoencephalography and an electroencephalography, and a step of grouping the equivalent current dipoles based on a predetermined criterion pertaining to a correlation coefficient of equivalent current dipole magnitudes.

The object is also attained by a method that comprises a step of adjusting magnitudes and orientations of equivalent current dipole moments of equivalent current dipoles disposed at predetermined locations to fit magnetic fields and electrical potential distributions produced by the equivalent current dipoles to measured data obtained with a magnetoencephalography and an electroencephalography, a first grouping step in which the equivalent current dipoles are grouped based on a predetermined criterion pertaining to a distance between current dipoles, and a second grouping step in which the equivalent current dipoles are grouped based on a predetermined criterion pertaining to a correlation coefficient of equivalent current dipole magnitudes.

The object is also attained by a method in which solving the problems is facilitated by constraining positions and orientations of equivalent current dipoles disposed at predetermined locations by using fMRI information as a basis for disposing the equivalent current dipoles at predetermined locations.

The method also includes facilitating the solving of the problems by constraining positions and orientations of the equivalent current dipoles disposed at predetermined locations by using equivalent current dipole position information obtained by the method of solving magnetoencephalogram inverse problems and equivalent current dipole position information obtained by fMRI, in which equivalent current dipole positions are provided beforehand at positions that include equivalent current dipole positions estimated by processing magnetoencephalographic signals and equivalent current dipole positions estimated based on fMRI information.

The method also includes facilitating the solving of the problems by constraining positions and orientations of the equivalent current dipoles disposed at predetermined locations by using information on the probable positions that equivalent current dipoles would appear obtained using the magnetoencephalogram inverse problem solution method and fMRI, in which equivalent current dipole positions are provided beforehand at positions that include equivalent current dipole probabilistic positions estimated by processing magnetoencephalographic signals and equivalent current dipole probabilistic positions estimated based on fMRI information.

Further features of the invention, its nature and various advantages will be more apparent from the accompanying drawings and following detailed description of the invention.

DESCRIPTION OF THE PREFERRED EMBODIMENT

Figure 1:
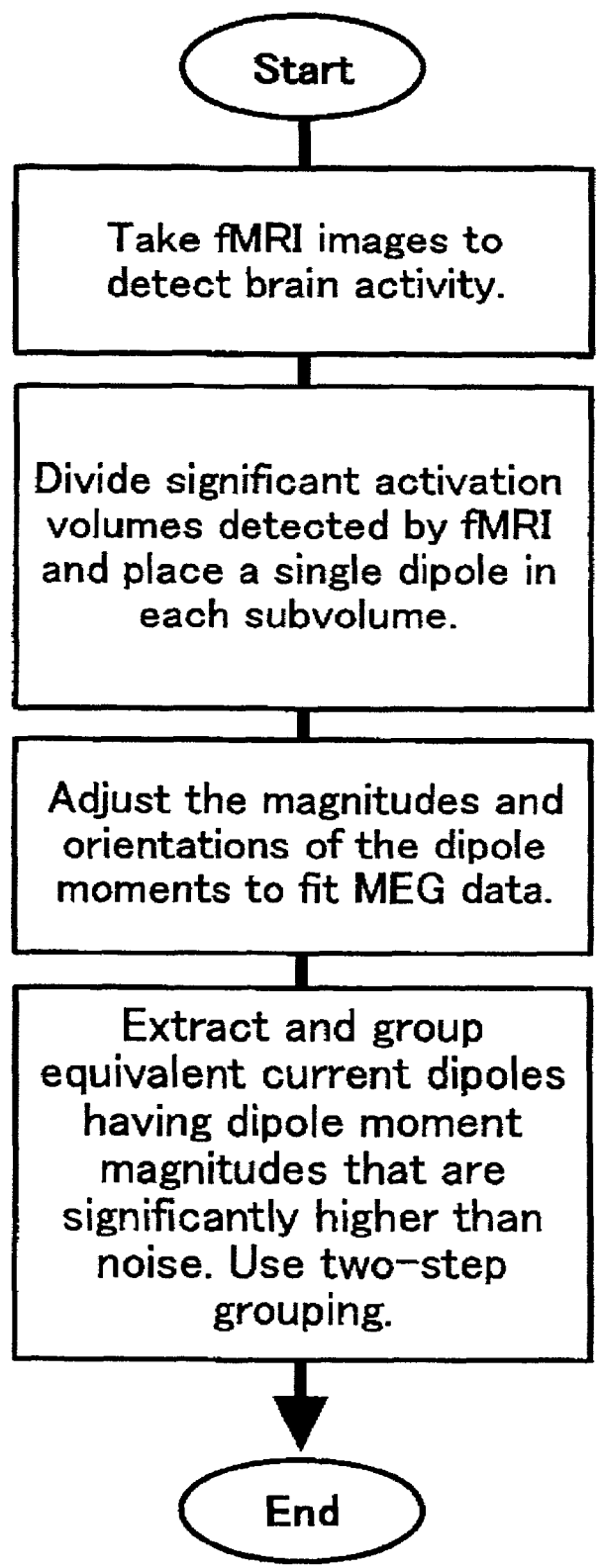
FIG. 1 is a flow chart of the data processing used in the present invention.

Details of embodiments of the present invention will now be described with reference to the drawings. Processing of MEG data in the method of solving magnetoencephalogram inverse problem according to the present invention will be described with reference to the flow chart of FIG. 1.

D1) First, fMRI is used to image brain activity. High-speed imaging is required for fMRI, for which echo planar imaging (EPI) is extensively used, although there are also other methods. Which method is used should be based on the location of the part being observed, on the apparatus environment, on imaging conditions, and so forth.

D2) Next, the areas of the brain are divided. Based on the fMRI images, activation volumes in which activity is observed are divided up and dipoles are placed in each of the subvolumes.

D3) The magnitude and orientation of each dipole are adjusted to fit the MEG data.

D4) Equivalent current dipoles having dipole moments that are significantly larger than noise are derived and grouped according to the criteria. The two-step grouping described below is used.

D4-1) when the distance between the two equivalent current dipoles was either not more than a predetermined reference distance used as a criterion, or D4-2) when the magnitudes of the two dipole moments were simultaneously large (significantly higher than the noise level), the dipoles were grouped (the vector sum obtained), replacing them by one dipole.

First grouping step: The above D4-1) and D4-2) are the criteria, as in the conventional way, to group the equivalent current dipoles. The criterion D4-1) is applied to dipoles within a small distance of around 2 cm. This groups dipoles that, being close together, are highly likely to influence one another. The moments of these dipoles are summed to set a new dipole having that moment. Focusing on the time it takes to obtain a magnitude that is markedly higher than the noise level, in addition to the distance constraint of D4-1), for at least some dipoles, the criterion D4-2) can also be used as a shared condition. Grouped dipoles and dipoles not yet grouped are included as members. The positions of grouped dipoles are treated as centroid positions weighted by the magnitude of the dipole moments. For the sake of simplicity, these can also be treated as averaged positions.

Second grouping step: The members of the grouped dipoles and dipoles not yet grouped are again subjected to grouping in which the criteria are a magnitude correlation coefficient of 80% or more and a separation between new members of not more than 4 cm. This is done to avoid unnecessary groupings by regrouping of groups and dipoles that are found within an interdependency separation distance of 4 cm, also taking into account the correlation of the dipole magnitudes. A two-step process is used to suppress the chaining effect. Since the correlation coefficient is a value that is influenced by noise, the threshold of the above criteria cannot be determined with exactitude, so the value used is an approximate predicted value or an empiric value obtained from actual data.

The condition of the dipole magnitude correlation of 80% or more came from the following situation. If Cads denotes the original correlation of two equivalent current dipoles, and CCd' denotes the correlation when there is crosstalk K, the following relationship is obtained between these quantities: $CCd'=[2K+(1+K^2)CCd]/[1+K^2+2K \times CCd]$. For example, in the case of no original correlation (CCd=0) and crosstalk K of 50% or more, CCd' would be 80% or more.

Figure 2:
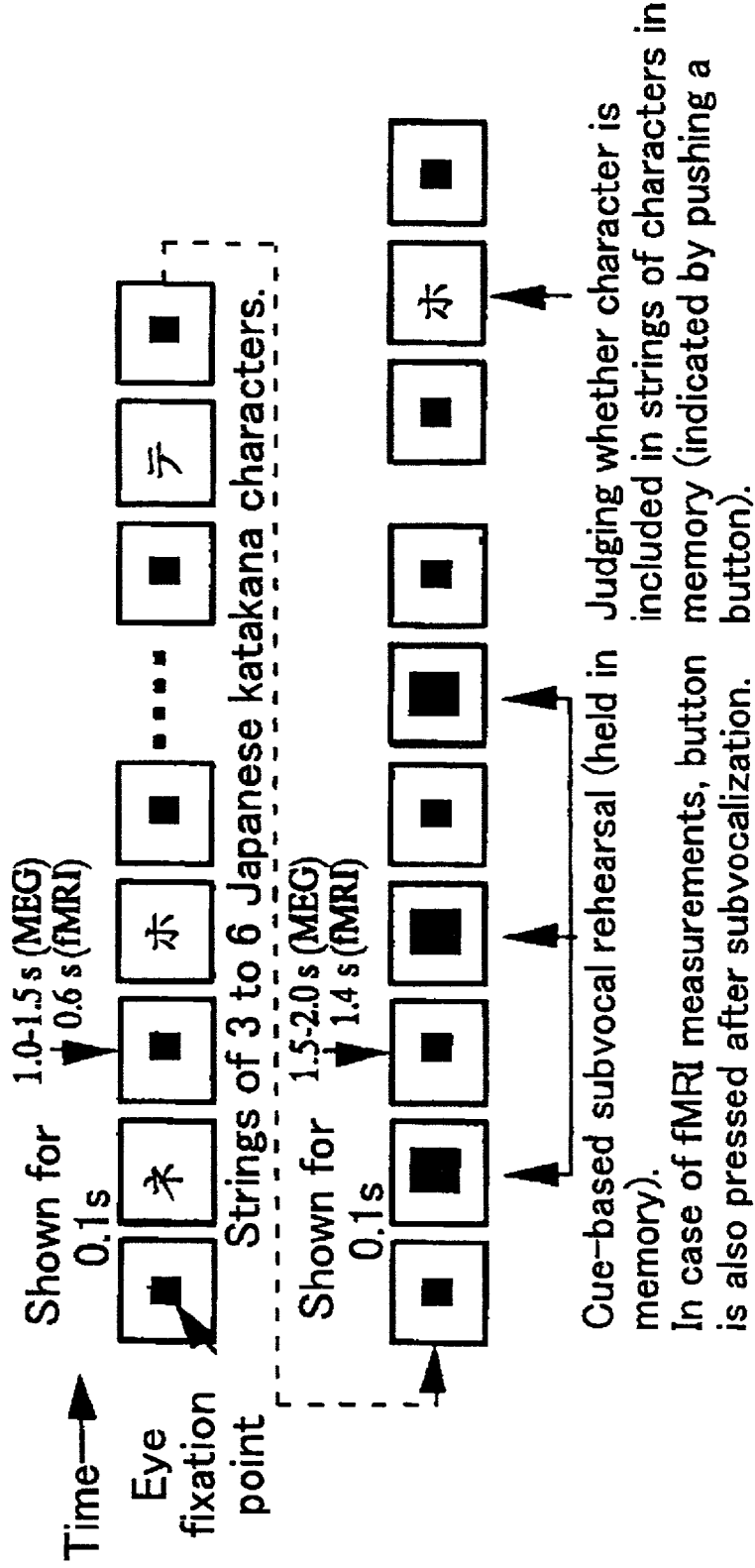
FIG. 2 is a block diagram showing test conditions used in an analysis of inner speech data.

An example will now be explained of an analysis of inner speech data in which the method of solving the problem uses information on brain activation areas measured by fMRI to fix the locations of a plurality of equivalent current dipoles. For this, use was made of a Sternberg paradigm. As a working-memory problem relating to a phonological loop, subjects were prompted by a visual cue to do a phonological task, an inner vocalization of meaningless 6-character sequences that were stored in memory, while taking fMRI and MEG measurements. FIG. 2 shows the results of the tests. As an fMRI control condition, the subjects' push-button response when shown random dot-patterns instead of characters was observed. The act of pushing the button corresponds to not performing an inner vocalization response even when prompted by the visual cue. In the images of the brain areas obtained by the fMRI process there is a pronounced difference between test-condition brain activity and control-condition brain activity, showing areas of test-condition activity.

The results were then applied to the method of solving MEG data inverse problems, in accordance with the procedure of the flow chart of FIG. 1. In the fMRI measurement results, clusters of voxels in which significant brain activity was detected were divided into dimensions not exceeding 2 cm (corresponding to separation tolerance obtained with a magnetic field correlation coefficient of 85% or more), and equivalent current dipoles ware placed at each of the areas thus divided, and the positions fixed, fitted to the MEG data. The times at which the magnitudes of dipole moments became significantly higher than the noise were obtained, and the moments of significant dipoles added together using the same treatment as in the case of one-step or two-step grouping, to thereby group the dipoles. These were then shown on a display, or printed out by a printer. The activation state of each of the parts of the brain could be understood by using these dipole groups to reproduce the time-sequences of the MEG data.

Figure 3A:
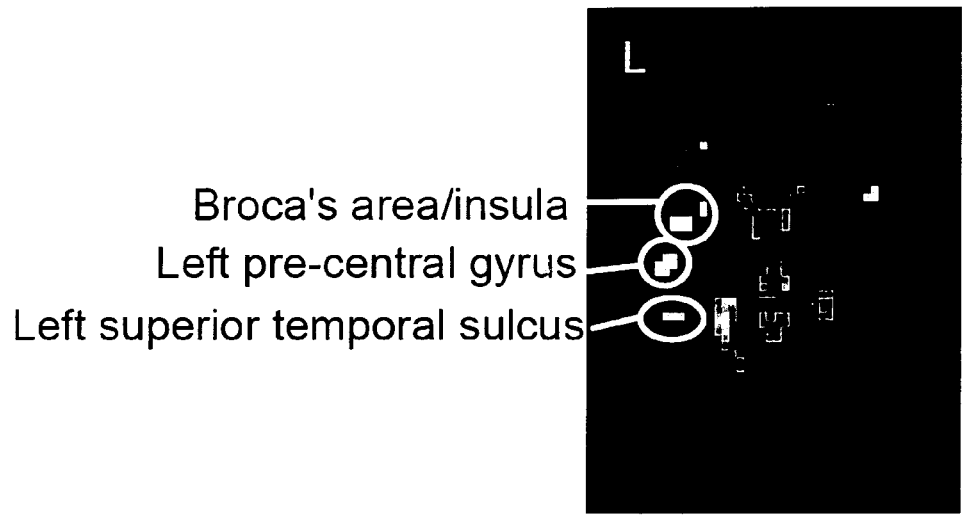
FIG. 3A shows an example of fMRI data.
Figure 3B:
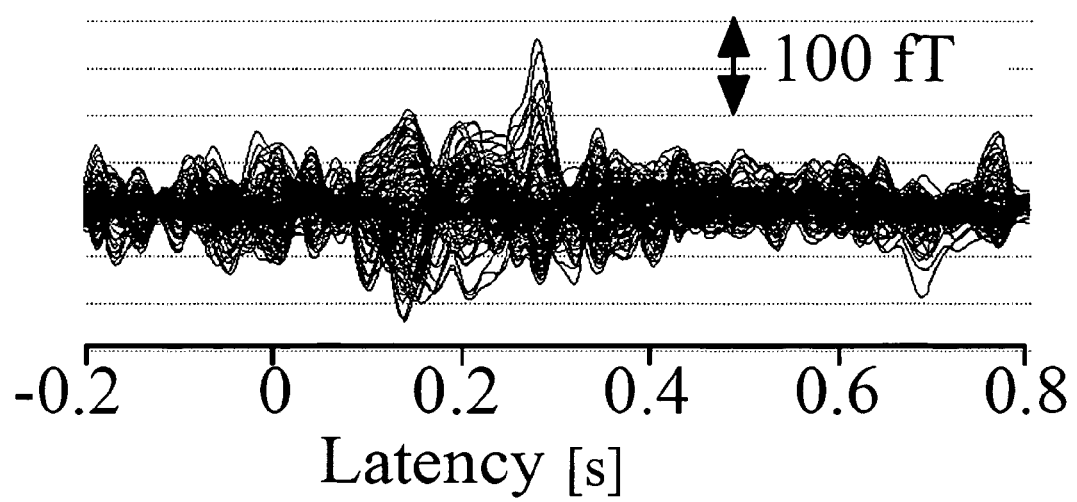
FIG. 3B shows an example of MEG data.
Figure 4:
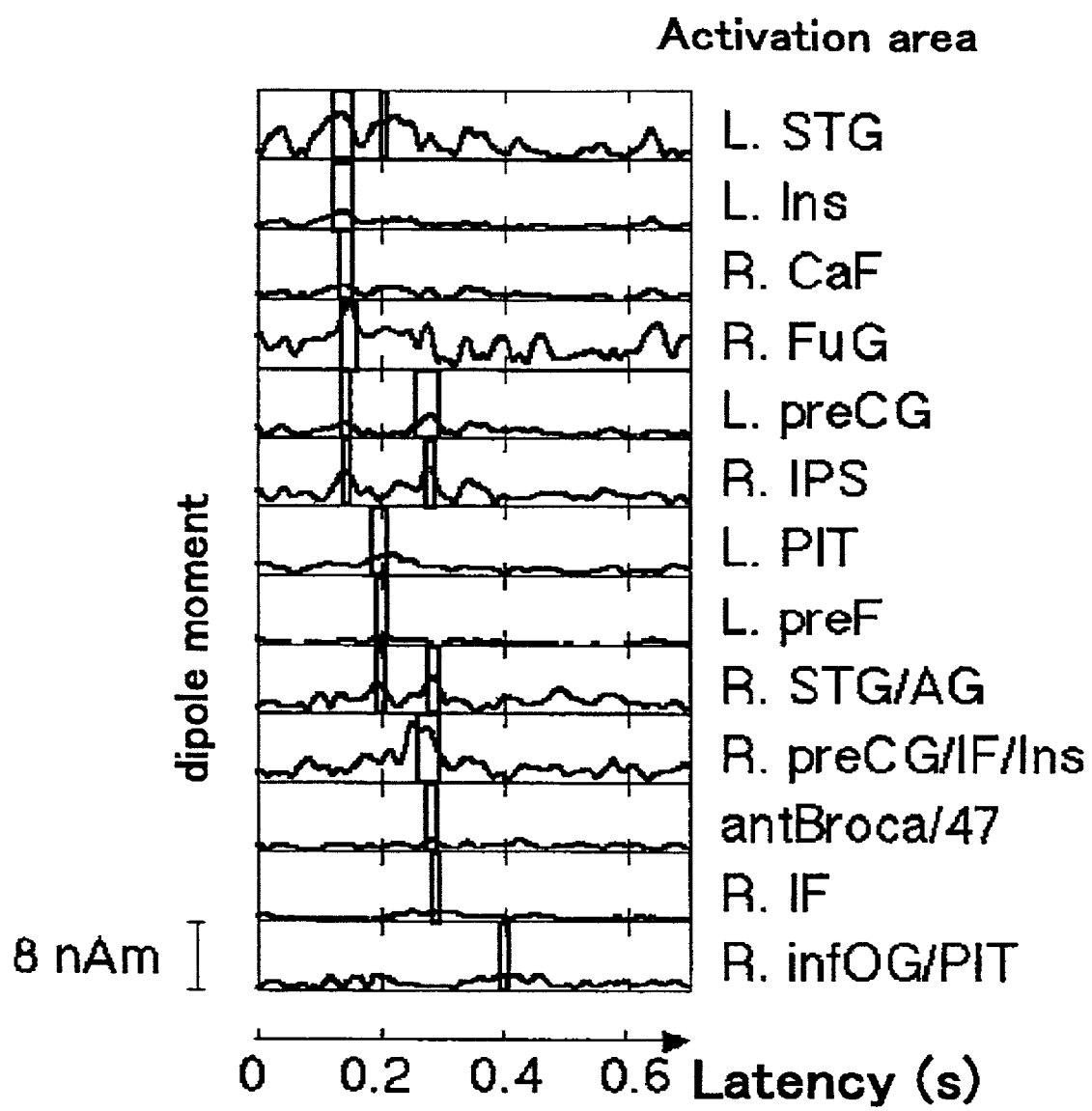
FIG. 4 illustrates the behavior of each group grouped using a two-step process.

FIGS. 3A and 3B show the results of fMRI and MEG measurements of a right-handed subject. From the clusters detected by fMRI, the locations of 56 equivalent current dipoles were extracted. Since the fMRI results were obtained by subtraction of activation from the control condition, 6 more dipoles were added in the vicinity of the visual cortex to represent neural activity that were estimated to occur in the control condition. As a result of the two-step grouping of the present invention, 35 significant dipoles were obtained and then grouped into 13 groups. These are shown in FIG. 4. Activity at the left posterior superior temporal area and the left inferior frontal area ranges from over 100 ms up to around 200 ms, and over the 200 ms level near Broca's area. These show the latency times of brain activity related to inner speech processes. Activity with similar latency times (the time between when a stimulus is applied and a signal is observed) was observed in corresponding areas in the left hemisphere. Especially in locations with similar activation times, such as Broca's area and the left posterior superior temporal area, this indicates functions connected with inner speech processes.

Figure 5:
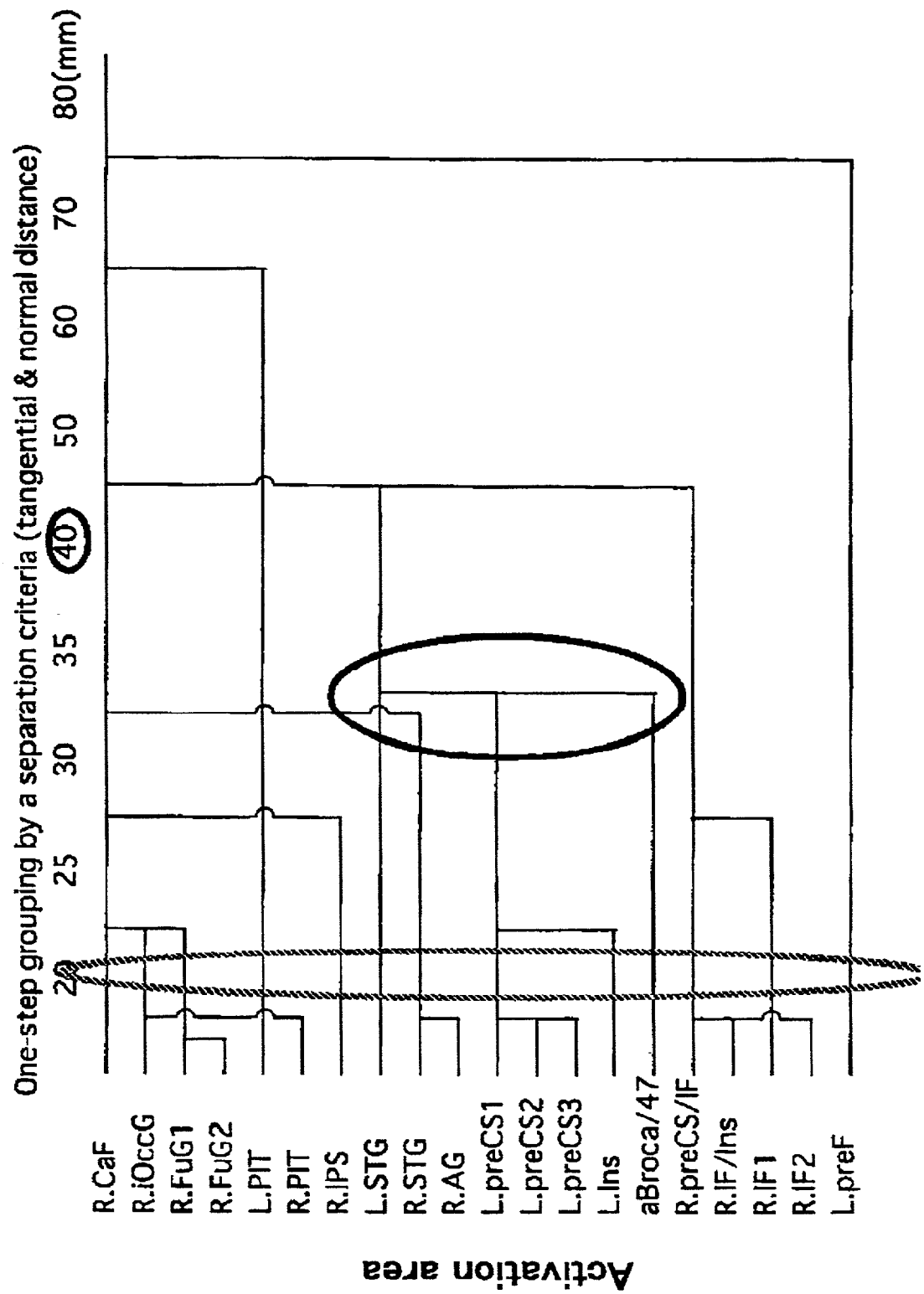
FIG. 5 shows one-step groupings using the same distance criterion in the tangential and normal directions.
Figure 6:
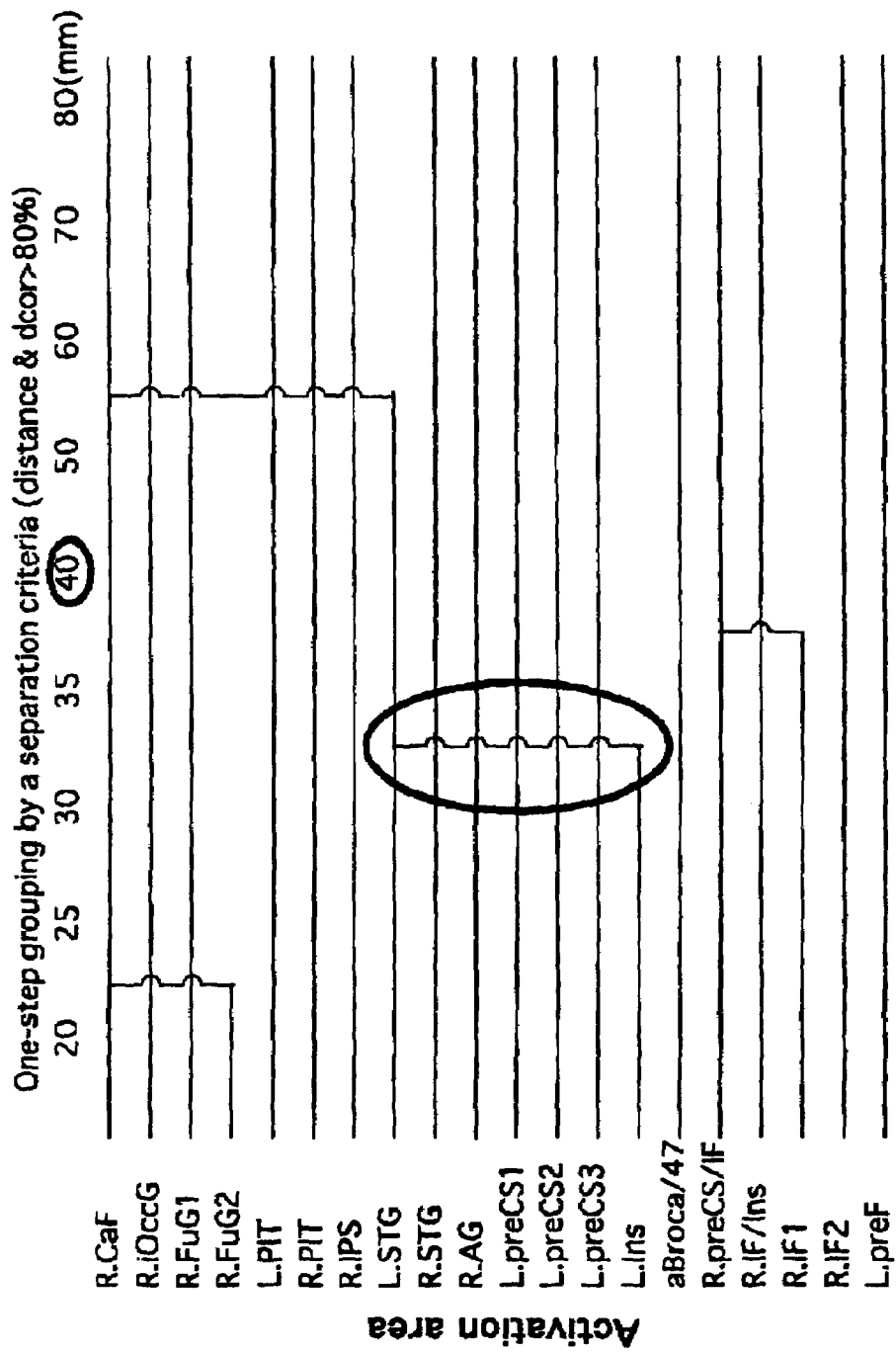
FIG. 6 shows extended one-step groupings based on criteria of distance and correlation coefficient (>80%).
Figure 7:
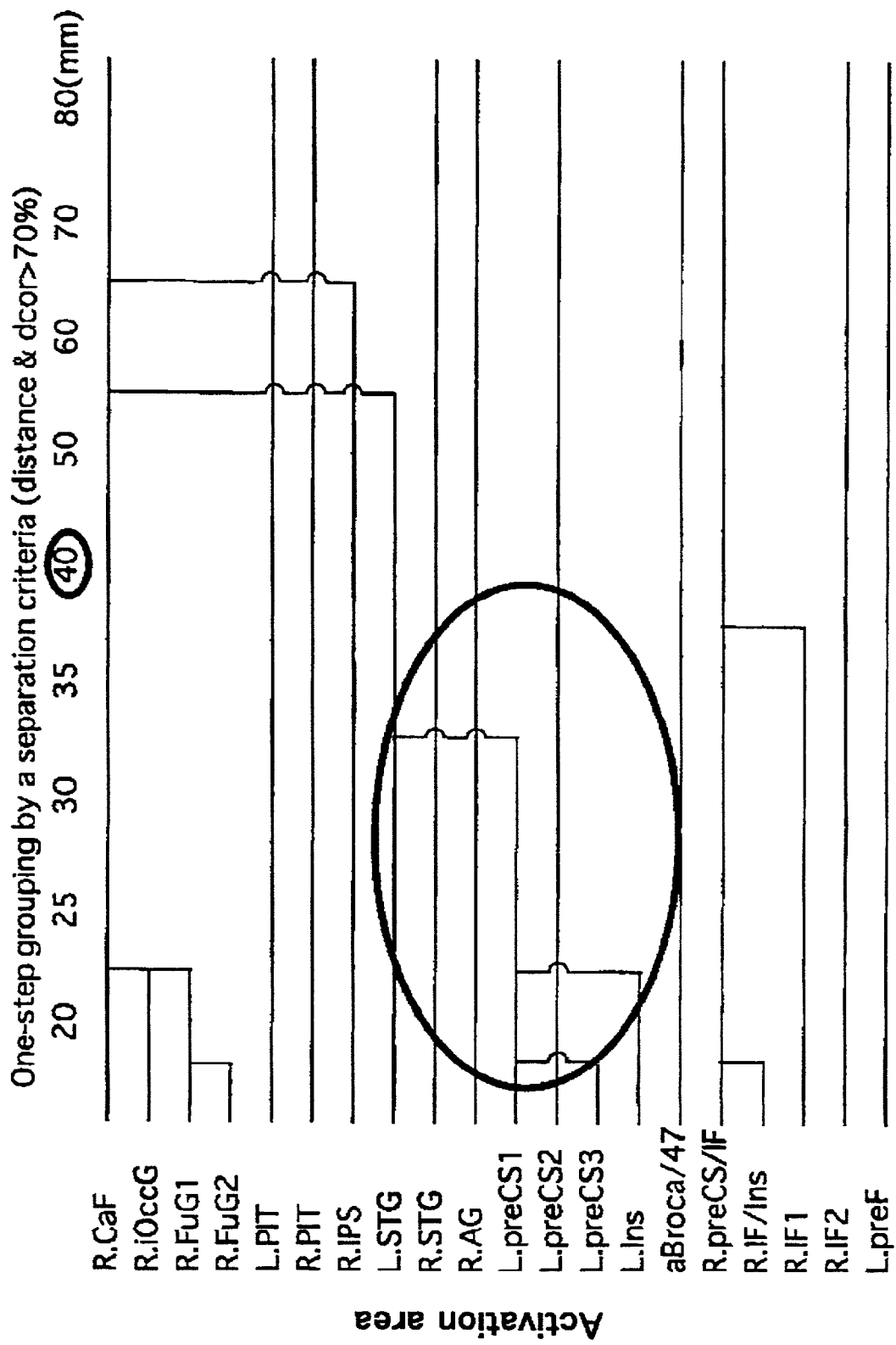
FIG. 7 shows extended one-step groupings based on criteria of distance and correlation coefficient (>70%).

FIGS. 5, 6 and 7 illustrate analyses of this data using a conventional one-step grouping procedure and an extended one-step grouping based on the criteria of distance and correlation coefficient of dipole magnitudes. Specifically, FIG. 5 shows one-step groupings using the same distance criterion in the tangential and normal directions; FIG. 6 shows extended one-step groupings based on distance and correlation coefficient (>80%); and FIG. 7 also shows extended one-step groupings based on distance and correlation coefficient (>70%). In these figures, the activation areas are listed on the vertical axis, and the horizontal axis represents distance. According to these figures, when 4 cm is selected as distance d based on studies of crosstalk, in the case of one-step groupings, when there is quite a separation between the left superior occipital area (L. STG) and the left inferior frontal area (aBroca/47) and the functions thereof could seemingly be considered to be correspondingly different, these are grouped in the same group (the solid elliptical line in FIG. 5). In further respect of one-step groupings, also, when a condition of 80% or more is applied as a condition to the correlation coefficient CCd of the dipole moment magnitudes, the above two parts do not become grouped, with only the left superior occipital area (L. STG) and the inferior frontal area (Insula) remaining grouped (solid elliptical line in FIG. 6). However, nearby areas such as L. preCS areas 1 to 3 and RFuG areas 1 and 2 are not grouped. If the CCd condition is relaxed to 70%, some grouping of these areas takes place, but then areas that are considered to be independent, such as the left superior occipital area (L. STG), the inferior frontal area (Insula) and the precentral fissure area (L. pfeCS 1 to 3) are grouped (the solid elliptical line in FIG. 7). In the case of extended one-step grouping in which the correlation coefficients of dipole magnitudes are also used as criteria, the problem also arises of areas that obviously should be grouped not being grouped, and formation of groups of areas that are not readily groupable.

However, when using the two-step grouping method of the present invention, the first grouping step performed using a dipole separation of 2 cm as the criterion produced 13 groups (indicated by the broken elliptical line in FIG. 5), in which the above areas that should be separated were separated. In this example, the second grouping step did not produce new groupings, so the first groupings remained as the final groups; FIG. 4 shows the results.

As described above, when 35 significant equivalent current dipoles were grouped using a conventional one-step procedure and an extended one-step grouping based also on the criterion of the correlation coefficient of dipole magnitudes, dipoles that it was considered should be separated were in fact grouped together, and dipoles that it was considered should have been grouped together were not thus grouped. In contrast, using the correlation coefficient of equivalent current dipole magnitudes as a criterion for grouping the dipoles, in accordance with the method of this invention, makes it possible to prevent such erroneous groupings and to prevent the chaining effect.

In the above example MG data was used for ECD estimation, but problems can be solved by the same procedure using EEG data. The difference between the two is in the fitting of the dipoles to the measured data. That is, in one case a magnetic field produced by the dipoles is fitted to the measured magnetic field distribution, and in the other case a voltage produced by the dipoles is fitted to the measured voltage distribution. These fitting methods are well known in conventional methods of solving the inverse problem, and therefore can readily be achieved using commercial software packages.

In setting dipole positions in the above embodiment, 56 equivalent current dipole locations on the head were extracted from clusters detected by fMRI. However, in some cases it is desirable to incorporate effects of dipoles of areas not detected by fMRI. For example, Reference 7 (K. Matsuura et al., IEEE Trans. Biomedical Engineering, Vol. 42, No. 6, 608-615 (1995)) describes a method of solving MEG inverse problems. But, dipole locations found by applying this method do not necessarily fully coincide dipole locations estimated using fMRI. It is therefore clear that a more desirable solution can be obtained by first applying the dipole inverse problem solving method to a multiplicity of equivalent current dipoles that include locations obtained by the MEG method and locations obtained by fMRI.

Reference 6 discusses the correlation between the probabilistic existence of dipoles and the fMRI signals. The correlation increases as the probability rises, but in some cases in which there is no correlation with the fMRI signals, it can be difficult to set the probability. In such cases, a more preferable solution can be obtained by using probabilistic weights on locations obtained by fMRI, and also by applying the above dipole inverse problem solving method.

The present invention configured as described in the foregoing provides the following effects. By using a short separation distance, such as 2 cm, as a criterion for grouping unit areas of brain activity detected by fMRI in a first grouping step, and a second grouping step in which group member dipoles having an interdependency found within a distance of, say, 4 cm, taking into account the correlation coefficient of dipole moment magnitudes of group member dipoles, are regrouped, it is possible to effect groupings that have no excessive deficiencies. The dipoles thus grouped can be used to accurately track temporal behavior of brain activity.

What is claimed is:
1. A method of tracking brain activity, comprising:
acquiring an image of brain activity showing a brain activation volume by a method other than magnetoencephalography or electroencephalography;
dividing the brain activation volume into subvolumes;
placing equivalent current dipoles in the subvolumes, respectively;
adjusting magnitudes and orientations of equivalent current dipole moments of the equivalent current dipoles such that magnetic fields produced by the equivalent current dipoles fit data obtained by magnetoencephalography;
grouping the equivalent current dipoles based on a criterion that a correlation coefficient of adjusted magnitudes is greater than a threshold; and outputting to one of a display and a printer an activation state of each of parts of the brain by using grouped equivalent current dipoles to reproduce time sequences of data obtained by the magnetoencephalography.

2. A method of tracking brain activity, comprising:

acquiring an image of brain activity showing a brain activation volume by a method other than magnetoencephalography or electroencephalography;

dividing the brain activation volume into subvolumes;

placing equivalent current dipoles in the subvolumes, respectively;

adjusting magnitudes and orientations of equivalent current dipole moments of the equivalent current dipoles such that magnetic fields produced by the equivalent current dipoles fit data obtained by magnetoencephalography;

grouping the equivalent current dipoles in a first grouping step of summing the equivalent current dipoles provided in a distance such that the equivalent current dipoles influence one another to set a new dipole at a centroid position weighted by magnitude of the equivalent current dipole moments;

grouping the moments of the new equivalent current dipole set in the first grouping step and the equivalent current dipoles not grouped in the first grouping step in a second grouping step based on a criterion that a correlation coefficient of adjusted magnitudes is greater than a threshold; and outputting to one of a display and a printer an activation state of each of parts of the brain by using grouped equivalent current dipoles obtained by the second grouping step to reproduce time sequences of data obtained by the magnetoencephalography.

3. A method of tracking brain activity, comprising:

acquiring an image of brain activity showing a brain activation volume by a method other than magnetoencephalography or electroencephalography;

dividing the brain activation volume into subvolumes;

placing equivalent current dipoles in the subvolumes, respectively;

adjusting magnitudes and orientations of equivalent current dipole moments of the equivalent current dipoles such that electrical fields produced by the equivalent current dipoles fit data obtained by electroencephalography;

grouping the equivalent current dipoles based on a criterion that a correlation coefficient of adjusted magnitudes is greater than a threshold; and outputting to one of a display and a printer an activation state of each of parts of the brain by using grouped equivalent current dipoles to reproduce time sequences of data obtained by the electroencephalography.

4. A method of tracking brain activity, comprising:

acquiring an image of brain activity showing a brain activation volume by a method other than magnetoencephalography or electroencephalography;

dividing the brain activation volume into subvolumes;

placing equivalent current dipoles in the subvolumes, respectively;

adjusting magnitudes and orientations of equivalent current dipole moments of the equivalent current dipoles such that electrical fields produced by the equivalent current dipoles fit data obtained by electroencephalography;

grouping the equivalent current dipoles in a first grouping step of summing the equivalent current dipoles provided in a distance such that the equivalent current dipoles influence one another to set a new dipole at a centroid position weighted by magnitude of the equivalent current dipole moments;

grouping the moments of the new equivalent current dipole set in the first grouping step and the equivalent current dipoles not grouped in the first grouping step in a second grouping step based on a criterion that a correlation coefficient of adjusted magnitudes is greater than a threshold; and outputting to one of a display and a printer an activation state of each of parts of the brain by using grouped equivalent current dipoles obtained by the second grouping step to reproduce time sequences of data obtained by the electroencephalography.

5. A method of tracking brain activity, comprising:

acquiring an image of brain activity showing a brain activation volume by a method other than magnetoencephalography or electroencephalography;

dividing the brain activation volume into subvolumes;

placing equivalent current dipoles in the subvolumes, respectively;

adjusting magnitudes and orientations of equivalent current dipole moments of the equivalent current dipoles such that magnetic fields and electrical fields produced by the equivalent current dipoles fit data obtained by magnetoencephalography and electroencephalography;

grouping the equivalent current dipoles based on a criterion that a correlation coefficient of adjusted magnitudes is greater than a threshold; and outputting to one of a display and a printer an activation state of each of parts of the brain by using grouped equivalent current dipoles to reproduce time sequences of data obtained by the magnetoencephalography and electroencephalography.

6. A method of tracking brain activity, comprising:

acquiring an image of brain activity showing a brain activation volume by a method other than magnetoencephalography or electroencephalography;

dividing the brain activation volume into subvolumes;

placing equivalent current dipoles in the subvolumes, respectively;

adjusting magnitudes and orientations of equivalent current dipole moments of the equivalent current dipoles such that magnetic fields and electrical fields produced by the equivalent current dipoles fit data obtained by magnetoencephalography and electroencephalography;

grouping the equivalent current dipoles in a first grouping step of summing the equivalent current dipoles provided in a distance such that the equivalent current dipoles influence one another to set a new dipole at a centroid position weighted by magnitude of the equivalent current dipole moments;

grouping the moments of the new equivalent current dipole set in the first grouping step and the equivalent current dipoles not grouped in the first grouping step in a second grouping step based on a criterion that a correlation coefficient of adjusted magnitudes is greater than a threshold; and outputting to one of a display and a printer an activation state of each of parts of the brain by using grouped equivalent current dipoles obtained by the second grouping step to reproduce time sequences of data obtained by the magnetoencephalography and electroencephalography.

7. The method according to claim 1, wherein the acquiring comprises acquiring an image of brain activity showing a brain activation volume by functional magnetic resonance imaging, and the dividing comprises dividing the brain activation volume into subvolumes.

8. The method according to claim 2, wherein the acquiring comprises acquiring an image of brain activity showing a brain activation volume by functional magnetic resonance imaging, and the dividing comprises dividing the brain activation volume into subvolumes.

9. The method according to claim 3, wherein the acquiring comprises acquiring an image of brain activity showing a brain activation volume by functional magnetic resonance imaging, and the dividing comprises dividing the brain activation volume into subvolumes.

10. The method according to claim 4, wherein the acquiring comprises acquiring an image of brain activity showing a brain activation volume by functional magnetic resonance imaging, and the dividing comprises dividing the brain activation volume into subvolumes.

11. The method according to claim 5, wherein the acquiring comprises acquiring an image of brain activity showing a brain activation volume by functional magnetic resonance imaging, and the dividing comprises dividing the brain activation volume into subvolumes.

12. The method according to claim 6, wherein the acquiring comprises acquiring an image of brain activity showing a brain activation volume by functional magnetic resonance imaging, and the dividing comprises dividing the brain activation volume into subvolumes.

13. The method according to claim 1, wherein the placing further includes placing equivalent current dipoles at positions of brain activity detected not by a method other than magnetoencephalography or electroencephalography but by using only measurement by magnetoencephalography or electroencephalography.

14. The method according to claim 2, wherein the placing further includes placing equivalent current dipoles at positions of brain activity detected not by a method other than magnetoencephalography or electroencephalography but by using only measurement by magnetoencephalography or electroencephalography.

15. The method according to claim 3, wherein the placing further includes placing equivalent current dipoles at positions of brain activity detected not by a method other than magnetoencephalography or electroencephalography but by using only measurement by magnetoencephalography or electroencephalography.

16. The method according to claim 4, wherein the placing further includes placing equivalent current dipoles at positions of brain activity detected not by a method other than magnetoencephalography or electroencephalography but by using only measurement by magnetoencephalography or electroencephalography.

17. The method according to claim 5, wherein the placing further includes placing equivalent current dipoles at positions of brain activity detected not by a method other than magnetoencephalography or electroencephalography but by using only measurement by magnetoencephalography or electroencephalography.

18. The method according to claim 6, wherein the placing further includes placing equivalent current dipoles at positions of brain activity detected not by a method other than magnetoencephalography or electroencephalography but by using only measurement by magnetoencephalography or electroencephalography.

19. The method according to claim 1, wherein an image of brain activity is acquired by measuring changes in blood flow in the brain.

20. The method according to claim 2, wherein an image of brain activity is acquired by measuring changes in blood flow in the brain.

21. The method according to claim 3, wherein an image of brain activity is acquired by measuring changes in blood flow in the brain.

22. The method according to claim 4, wherein an image of brain activity is acquired by measuring changes in blood flow in the brain.

23. The method according to claim 5, wherein an image of brain activity is acquired by measuring changes in blood flow in the brain.

24. The method according to claim 6, wherein an image of brain activity is acquired by measuring changes in blood flow in the brain.

25. The method according to claim 7, wherein the placing further includes placing equivalent current dipoles at positions of brain activity detected not by functional magnetic resonance imaging but by using only measurement by magnetoencephalography or electroencephalography.

26. The method according to claim 8, wherein the placing further includes placing equivalent current dipoles at positions of brain activity detected not by functional magnetic resonance imaging but by using only measurement by magnetoencephalography or electroencephalography.

27. The method according to claim 9, wherein the placing further includes placing equivalent current dipoles at positions of brain activity detected not by functional magnetic resonance imaging but by using only measurement by magnetoencephalography or electroencephalography.

28. The method according to claim 10, wherein the placing further includes placing equivalent current dipoles at positions of brain activity detected not by functional magnetic resonance imaging but by using only measurement by magnetoencephalography or electroencephalography.

29. The method according to claim 11, wherein the placing further includes placing equivalent current dipoles at positions of brain activity detected not by functional magnetic resonance imaging but by using only measurement by magnetoencephalography or electroencephalography.

30. The method according to claim 12, wherein the placing further includes placing equivalent current dipoles at positions of brain activity detected not by functional magnetic resonance imaging but by using only measurement by magnetoencephalography or electroencephalography.

31. The method according to claim 19, wherein the placing further includes placing equivalent current dipoles at positions of brain activity detected not by measuring changes in blood flow in the brain but by using only measurement by magnetoencephalography or electroencephalography.

32. The method according to claim 20, wherein the placing further includes placing equivalent current dipoles at positions of brain activity detected not by measuring changes in blood flow in the brain but by using only measurement by magnetoencephalography or electroencephalography.

33. The method according to claim 21, wherein the placing further includes placing equivalent current dipoles at positions of brain activity detected not by measuring changes in blood flow in the brain but by using only measurement by magnetoencephalography or electroencephalography.

34. The method according to claim 22, wherein the placing further includes placing equivalent current dipoles at positions of brain activity detected not by measuring changes in blood flow in the brain but by using only measurement by magnetoencephalography or electroencephalography.

35. The method according to claim 23, wherein the placing further includes placing equivalent current dipoles at positions of brain activity detected not by measuring changes in blood flow in the brain but by using only measurement by magnetoencephalography or electroencephalography.

36. The method according to claim 24, wherein the placing further includes placing equivalent current dipoles at positions of brain activity detected not by measuring changes in blood flow in the brain but by using only measurement by magnetoencephalography or electroencephalography.

37. The method according to any one of claims 1 to 18 and 19 to 36, wherein the dividing is the dividing of a brain activation volume showing significant brain activity into subvolumes not larger than 2 centimeters.

38. The method according to any one of claims 2, 4, 6, 8, 10, 12, 14, 16, 18, 20, 22, 24, 26, 28, 30, 32, 34, and 36, wherein the grouping further includes a first grouping step of grouping the equivalent current dipoles at a distance at which the equivalent current dipoles influence one another and which is not more than 2 centimeters, and a second grouping step of grouping the equivalent current dipoles separated by not more than 4 centimeters based on a criterion that a correlation coefficient of adjusted magnitude is greater than a threshold that is 80% or more of a correlation coefficient of moments of the equivalent current dipoles.

39. The method according to any one of claims 13 to 18 and 26 to 37, wherein the placing comprises placing equivalent current dipoles in the subvolumes, respectively, of the brain activation volumes obtained by a method other than magnetoencephalography or electroencephalography divided up, and placing equivalent current dipoles at the positions, respectively, obtained by using only measurement by magnetoencephalography or electroencephalography, with probabilistic weights respectively, and the probabilistic weights are used in the adjusting of the magnitudes and orientations of the equivalent current dipoles.

* * * * *